Nov. 26, 1929.   L. MONTIGNY   1,737,167
BELT FASTENER
Filed Sept. 22, 1928    2 Sheets-Sheet 2
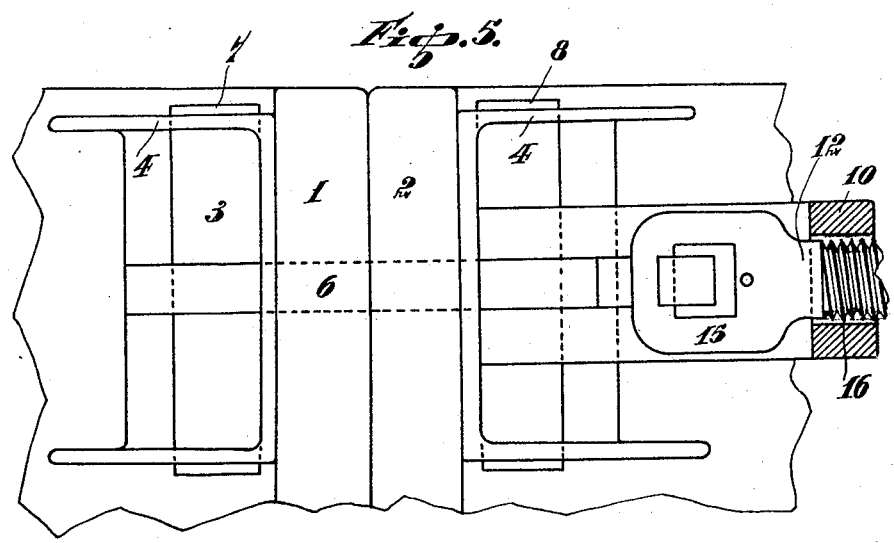
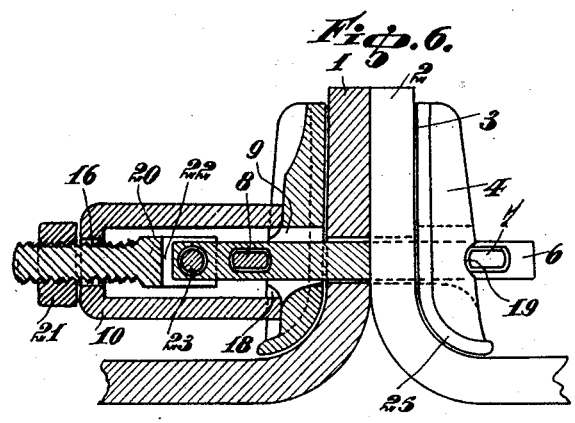
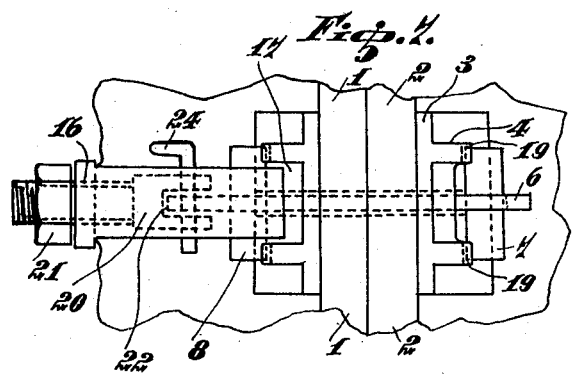
Inventor.
Louis Montigny
Attorney.

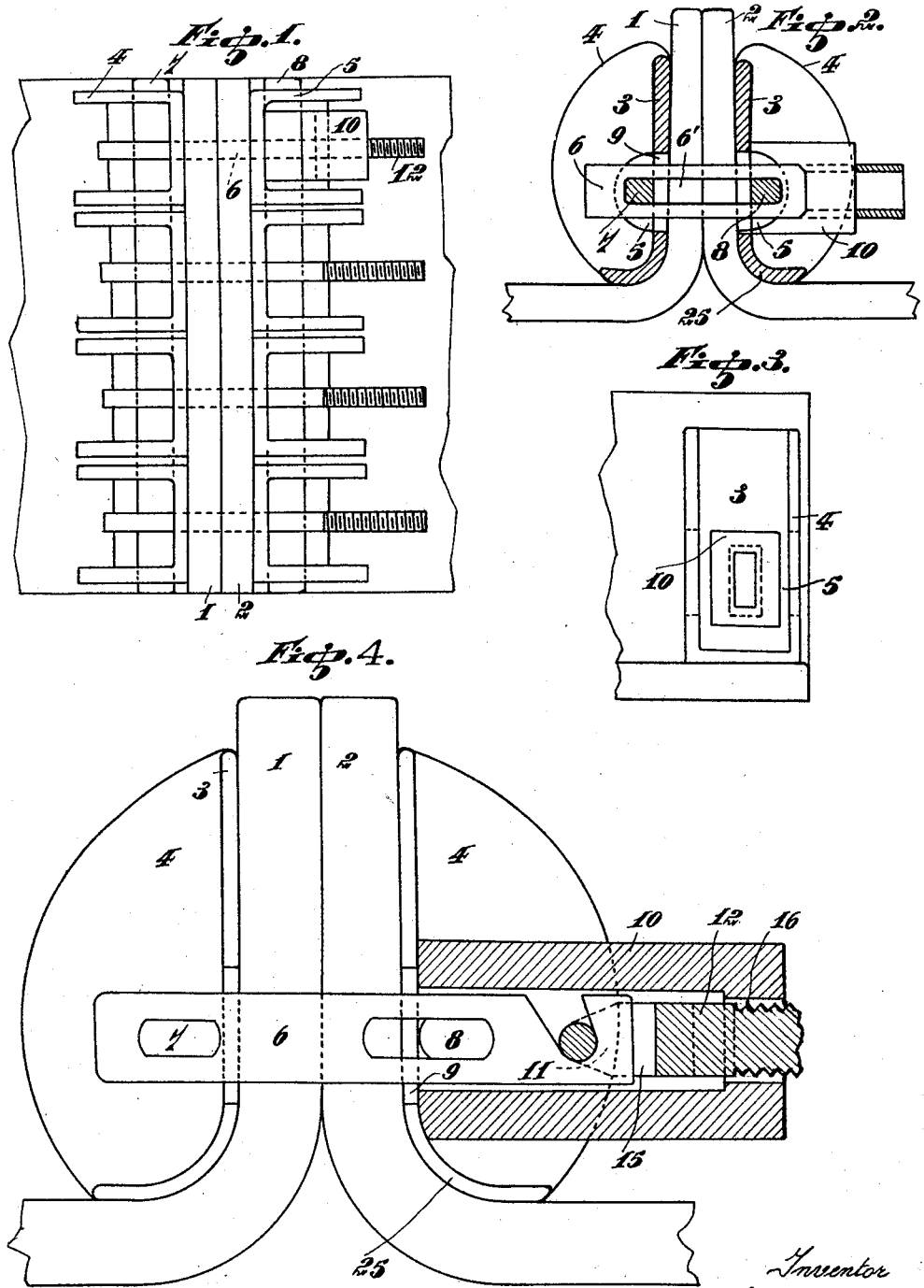

Patented Nov. 26, 1929

1,737,167

UNITED STATES PATENT OFFICE

LOUIS MONTIGNY, OF GHENT, BELGIUM

BELT FASTENER

Application filed September 22, 1928, Serial No. 307,731, and in Belgium October 5, 1927.

The present invention consists in the improvements in and relating to fasteners for joining the ends of driving belts of the type in which the ends of the belt, bent at right angles, are pressed between two rows of plates joined in pairs by means of cross-bars passing through the ends of the belt and the plates, said cross-bars being retained in position by retaining bars or cotters pressing on the plates and passing through holes in said cross-bars.

The present invention has for its object to provide an improved belt fastener of the type set forth. According to the invention, the plates of the fastener are provided with ribs forming flanges, which are pierced with holes for the passing of uninterrupted retaining bars of the fastener, so that all the plates are simultaneously joined whereby the steadiness of the fastener is obtained by adjacent ribs of the said plates.

With the object of providing a movable device allowing an easy and efficient tightening to be obtained, according to the invention, threaded parts are provided at the end of the cross-bars, arranged so that a tightening may be effected by means of a nut pressing, when screwed, against stirrup- or fork-shaped members, which act upon the plates.

According to the invention, the threaded parts on the cross-bars may also be dispensed with and a hook may be provided at the end of each cross-bar, such hook engaging with a special tightening member comprising a nut bearing upon the said stirrup- or fork-shaped members, acting upon the plates, by screwing the nut on a threaded part of the tightening member.

The invention will be hereinafter described in detail, with reference to the figures of the accompanying drawings, which illustrate, merely by way of an example, different embodiments of the invention.

Fig. 1 is a plan view of the improved fastener according to the invention;

Fig. 2 is a transverse section and

Fig. 3 a partial back view of the same;

Figs. 4 and 5 are vertical and horizontal sections illustrating another embodiment of the invention;

Figs. 6 and 7 illustrate a further embodiment of the invention.

With reference to these figures, the ends 1 and 2 of the belt to be joined are bent at right angles. This bending is made with a curve of a sufficiently great radius to avoid abnormal transverse strain and is guided by the rounded part 25 of plates 3. These plates, which serve to maintain the ends 1 and 2 pressed against each other are reinforced by flanges or ribs 4. The plates 3, as also the ends 1 and 2 of the belt, are pierced with holes necessary for the passing of cross-bars 6 provided with holes for the passing of retaining bars or cotters 7 and 8. The tightening of the fastener during its mounting is effected by putting the elements in their respective positions, the cross-bars 6 and retaining bars 7 included, but the retaining bars 8 excluded. A traction is exerted on the end of the cross-bars located at the same side as the retaining bars 8, the plates of each pair of plates thus being brought nearer to each other, so as to press against each other the ends of the belt, with the result to clear the holes of the cross-bars for the passage of the retaining bars 8. When these holes are sufficiently cleared, the operator chooses amongst a set of bars or cotters the ones having the width of the free width of the hole and engages them in said hole, taking care, of course, not to use a retaining bar 8 weaker than the first positioned retaining bar 7.

According to the invention, the plates 3 are reinforced by ribs 4 projecting outwardly, as shown in Figs. 1 and 2, these ribs being pierced with holes 5 for the passing of the retaining bars or cotters. A retaining bar joining all the elements of the fastener can be used, or a separate cotter for each plate can be utilized.

In order to effect an easy and efficient tightening, a threaded part 12 (Figs. 1 and 2) is provided at the lengthened end of each cross-bar 6 and the nut 21, similar to those of Figs. 6 and 7 may be screwed on these threaded parts, these nuts being arranged so as to rest on a special tightening device formed as a stirrup or a fork-shaped member 10 with a central recess allowing the passage of said threaded end 12 of the bar 6. By screwing the nut 21, a traction is exerted on the crossbar 6, so that the hole for the retaining bar 8 is cleared without difficulties. The retaining bar 8 being passed through the hole, the tightening device is then removed and, owing to the elasticity of the belt ends 1 and 2, the fastener is maintained perfectly joined. During the working, this fastening cannot get loose under any circumstances. This fastener presents thus the advantage of lesser weakening of the ends of the belt by the cross-bar holes, and avoiding the disadvantages met with in practice by the use of screws, which are subjected to very defective working conditions, being given the strain exerted in such a joint.

It is obvious that, instead of providing the cross-bar 6 with two holes for inserting the retaining bars 7 and 8, only one single hole 6' may be arranged, as shown in Fig. 2, the length of which being sufficient for providing passages for the retaining bars 7 and 8.

According to another embodiment of the invention, the price of the cross-bars may be reduced by avoiding threaded parts on the cross-bars. To this effect, the cross-bars are provided at their ends with a hook 11 (Figs. 4 and 5), in which can engage the head of an eye 15 forming part of a tightening member 12, provided with a threaded part 16 for the screwing of a nut acting as before described.

According to a further embodiment of the invention, illustrated on Figs. 6 and 7, the plates are provided with less projecting ribs 4, but they have a longitudinal reinforcement 17, against which the tightening stirrup or fork-shaped member 10 presses, and a transverse rib 18, on which the retaining bar can bear. This retaining bar can, moreover, be more perfectly maintained in its place by contriving a groove 19 in the rib 18. The plates are provided with a bend 25 of sufficient radius to avoid the bending of the ends 1 and 2 of the belt bringing about abnormal transverse strain in said belt ends. For the mounting, stirrup or fork-shaped members 10 bearing on the plates 3 on both sides of the cross-member 6 are utilized and a traction is exerted on this cross-bar by screwing on them nuts 21 pressing against the stirrup members 10.

According to another embodiment of the invention, the tightening member is shaped as illustrated on Figs. 6 and 7. Its square sectioned body 20 is provided at one end with a threaded part 16, on which the tightening nut 21 is screwed and at its other end it has the shape of a fork with a central recess 22, in which can engage the end of cross-bar 6. The two arms of the fork and the end of the bar 6 are pierced with holes 23, in which can engage a stem 24; this stem can advantageously consist of a round iron element bent at right angles, so as to form a handle.

It is sufficient to engage the end of the cross-bar 6 in the recess 22 of the tightening element 20, to insert the stem 24 and to tighten nut 21, so as to be able to exert the necessary traction while mounting the fastener. When the retaining bars 8 are put in their place, the loosening of nut 21 allows the stem 24 to be withdrawn and the mounting elements 10, 20 and 21 to be easily removed.

The improved fastener according to the invention presents a very great solidity and security.

Experiments have shown that it has a resistance which exceeds 75% of the resistance of the belt. It enables to effect during the mounting, without any difficulty, a very efficient tightening and the manufacture of the elements which are made use of is simple, easy and economical.

I claim:

1. A belt fastening device, comprising in combination: a pair of adjacent belt ends, a succession of plate members supported on each of said belt ends, said plate members being arranged in opposite pairs, a single connecting link passing through the plate members of each pair, an elongated hole in each connecting link, two retaining bars passing through said hole and bearing respectively against the outer side of two opposite plates and a curved portion forming part of said plates to act as a guide for the belt.

2. A belt fastening device, comprising in combination: a pair of adjacent belt ends, a succession of plate members supported on each of said belt ends, said plate members being arranged in opposite pairs, a single connecting link passing through the plate members of each pair, an elongated hole in each connecting link, two uninterrupted retaining bars passing through the holes of all the connecting links, respectively on either side of the adjacent belt ends and a curved portion forming part of said plates to act as a guide for the belt.

3. A belt fastening device, comprising in combination: a pair of adjacent belt ends, a succession of plate members supported on each of said belt ends, said plate members being arranged in opposite pairs, a single connecting link passing through the plate members of each pair, an elongated hole in each connecting link, two uninterrupted retaining bars passing through the holes of all the connecting links, respectively on either side of the adjacent belt ends, longitudinal and transverse ribs on said plate members, grooves in said transverse ribs to engage the retaining bars and a curved portion forming part of said plates to act as a guide for the belt.

4. In a belt fastener of the type set forth, a tightening device comprising a threaded axial extension of the connecting link joining two opposite clamping plate members, a fork-shaped member resting on the back side of the plate and engaging the threaded extension, and a nut screwed on said threaded extension and pressing on said fork-shaped member, whereby a traction is operated on the connecting link, substantially as and for the purpose described.

5. In a belt fastener of the type set forth, a tightening device comprising a hook axially extending from the connecting link joining two opposite plate members, a fork-shaped member resting on the back side of the plate and bridging over the hook, a threaded bar engaging an axial passage in said fork-shaped member and provided with an eye adapted to engage said hook, a nut screwed on said threaded bar and bearing on said fork-shaped member, so that, by screwing the nut, a traction is exerted on said connecting link, substantially as and for the purpose described.

6. In a belt fastener of the type set forth, a tightening device comprising an axial extension of the connecting link joining two opposite clamping plate members, a fork-shaped member resting on the back side of the plate and bridging over the axial extension, a threaded bar engaging an axial passage in said fork-shaped member, a pivotal connection between the ends of the threaded bar and axial extension respectively, and a nut screwed on the threaded bar and bearing on said fork-shaped member, so that a traction is exerted on the connecting link, substantially as and for the purpose described.

7. In a belt fastener of the type set forth, a tightening device comprising an axial extension of the connecting link joining two opposite clamping plate members, a fork-shaped member freely engaging ribs on the back side of the plate and bridging over the axial extension, a threaded bar engaging an axial passage in said fork-shaped member, a pivotal connection between the ends of the threaded bar and axial extension respectively, and a nut screwed on the threaded bar and bearing on said fork-shaped member, so that a traction is exerted on the connecting link, substantially as and for the purpose described.

In testimony whereof I have signed hereunto my name.

L. MONTIGNY.